Feb. 28, 1933. H. STEIN 1,899,596
MOTOR MOUNTING
Filed Feb. 5, 1931

Inventor:
Herbert Stein,
by Charles E. Muller
His Attorney.

UNITED STATES PATENT OFFICE

HERBERT STEIN, OF BERLIN, GERMANY, ASSIGNOR TO GENERAL ELECTRIC COMPANY, A CORPORATION OF NEW YORK

MOTOR MOUNTING

Application filed February 5, 1931, Serial No. 513,767, and in Germany February 12, 1930.

My invention relates to motor mountings.

It is necessary to provide high speed motors with a resilient mounting because the motor shaft passes through its critical speed in attaining its normal speed, and unless some resilient mounting is provided the vibration of the motor shaft may reach such amplitude that the motor rotor will rub against the stator and prevent its attaining normal running speed. It has been the practice heretofore to provide resilient supports on which the motor frame rests on the spinning frame. This arrangement has the disadvantage that the motor may become displaced in operation, and also that it may be displaced from the shields which protect the same from the liquid used in the spinning process.

The object of my invention is to provide a resilient support for a motor of this type which will securely support the motor in place while it is in operation and provide the necessary resiliency to permit the motor shaft to pass through its critical speed and, at the same time, provide for ready removal of the motor from its support. I accomplish this by providing a motor having a frame, a supporting frame spaced from the motor frame and a plurality of resilient members carried by one of the frames which are retained in recesses formed in the other frame in such manner as to securely support the motor and provide for its ready removal from the supporting frame upon relative movement between the frames.

My invention will be more fully understood from the following description referring to the accompanying drawing, and the features of novelty which characterize my invention will be pointed out with particularity in the claims annexed to and forming a part of this specification.

Figure 1:
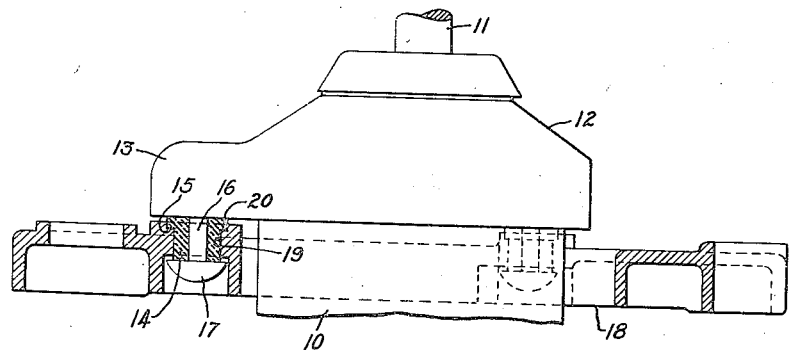
Figure 2:
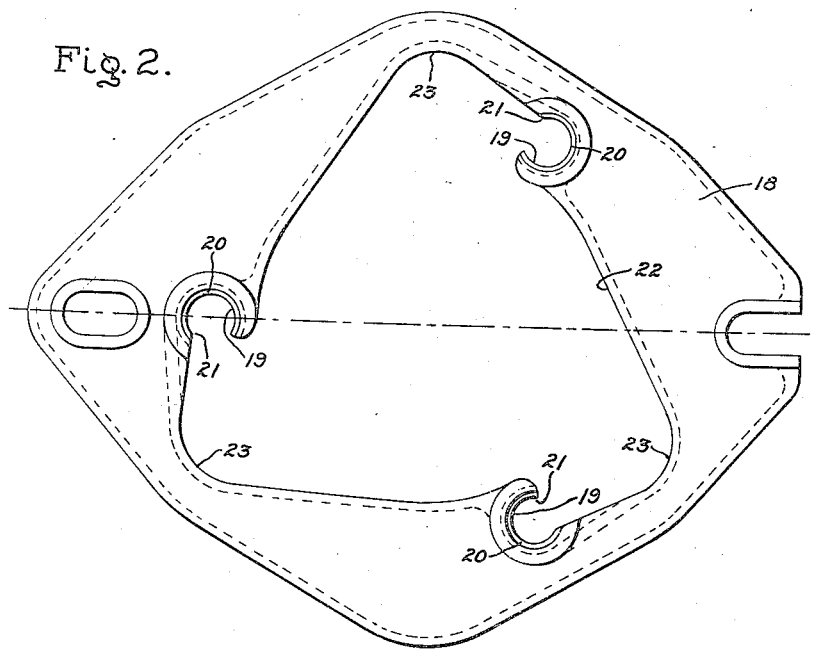

In the drawing, Fig. 1 is a side elevation partly broken away showing my improved resilient motor support, and Fig. 2 is a plan view of the supporting frame.

Referring to the drawing, for convenience in illustration, I have shown my invention as applied to a vertical shaft rayon motor 10 having a shaft 11 on which the usual rayon bucket is detachably mounted. The motor is provided with an end shield 12 having three projections 13 by which the motor is resiliently supported out of contact with a supporting frame.

In accordance with my invention, a resilient support is provided which prevents the motor being displaced from its operative position, but permits ready removal of the motor whenever desired by merely moving the motor slightly with respect to the supporting frame. It is to be understood that the particular arrangement which I have illustrated is merely an example of one manner of carrying out my invention. I have shown each of the projections 13 of the motor provided with cylindrical resilient supports 14 of rubber or other suitable material or construction. The supports 14 are provided with shoulders 15 and are secured beneath the projections 13 by pins 16 having enlarged heads 17, the cylindrical resilient supports 14 being arranged with their axes substantially parallel to the axis of the motor.

A supporting frame 18 is provided, which can be bolted or otherwise secured to the frame of the spinning frame on which the motor is used. The frame 18 is provided with a plurality of cylindrical recesses 19 of the same size as the main body of the resilient supports 14, and adapted to engage them, and a shoulder 20 on which the shoulders 15 of the resilient supports rest. The cylindrical recesses 19 are provided with restricted openings 21 presented substantially tangential to the frame of the motor, and all of them open in the same tangential direction. The frame 18 is provided with a central opening 22, the side walls of which extend from the outer sides of the restricted openings 21 which extend tangentially of the motor from the side of the openings 21 and are then curved as indicated at 23 toward the inner side of the adjacent openings 21 so as to form openings through which the end shield 12 and projections 13 can be lowered out of the supporting frame when the end shield is turned from the position in which the cylindrical resilient members engage the cylindrical recesses 19 toward the curved portion 23 of the opening 22.

It is apparent from the foregoing that when I wish to resiliently secure the motor 10 in the supporting frame 18, I introduce the motor upwardly or downwardly into the supporting frame with the resilient projections 14 approximately at the rounded portions 23 of the side walls of the opening 22 and substantially in alignment with the recesses 19 and rotate the motor frame clockwise as viewed from above. The resilient members 14 are compressed in passing through the restricted openings 21 and then expand to closely fit the recesses 19 with the shoulders 15 of the resilient members 14 resting on the shoulders 20 of the recesses 19. This resiliently supports the motor in operative position and provides sufficient resiliency for the motor shaft to pass through its critical speed. If it is then desired to remove the motor 10 from the supporting frame 18, I turn the motor counterclockwise in the frame as viewed from above causing the resilient members 14 to pass through the restricted openings 21 toward the rounded portions 23 of the supporting frame, in which position the motor can be readily removed downwardly or upwardly from the supporting frame as desired.

Modifications of the construction which I have described will occur to those skilled in the art, so that I desire it to be understood, therefore, that I do not desire to be limited to the particular construction set forth, and I intend in the appended claims to cover all modifications which do not depart from the spirit and scope of my invention.

What I claim as new and desire to secure by Letters Patent of the United States, is,—

1. A motor having a frame, a plurality of resilient members carried by said motor frame, said resilient members having their axes extending substantially parallel to the axis of said motor, a supporting frame spaced from said motor frame and having recesses retaining said resilient members and having constricted openings presented in a direction approximately tangential to said motor to provide for releasing said resilient members upon turning said motor frame with respect to said supporting frame to force said resilient members through said constricted openings so that said motor can be removed therefrom.

2. A motor having a frame including an end shield, a plurality of shouldered resilient members carried by said end shield having their axes extending substantially parallel to the axis of said motor, a supporting frame arranged about said motor and spaced therefrom, said supporting frame having shouldered recesses in its inner wall arranged to retain said resilient members and constricted openings presented in a direction substantially tangential to said motor to provide for releasing said resilient members upon turning said motor frame with respect to said supporting frame to force said resilient members through said constricted openings so that said motor can be removed therefrom.

In witness whereof, I have hereunto set my hand this 20th day of January, 1931.

HERBERT STEIN.